(12) United States Patent
Vick, Jr. et al.

(10) Patent No.: US 11,035,199 B2
(45) Date of Patent: Jun. 15, 2021

(54) SECTION-BALANCED ELECTRIC SAFETY VALVE

(71) Applicant: Halliburton Energy Services, Inc., Houston, TX (US)

(72) Inventors: James Dan Vick, Jr., Dallas, TX (US); Bruce Edward Scott, McKiney, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 20 days.

(21) Appl. No.: 16/462,150

(22) PCT Filed: Jul. 24, 2018

(86) PCT No.: PCT/US2018/043388
§ 371 (c)(1),
(2) Date: May 17, 2019

(87) PCT Pub. No.: WO2020/023018
PCT Pub. Date: Jan. 30, 2020

(65) Prior Publication Data
US 2020/0270965 A1    Aug. 27, 2020

(51) Int. Cl.
*E21B 34/06* (2006.01)
*F16K 1/20* (2006.01)
*F16K 31/06* (2006.01)

(52) U.S. Cl.
CPC .......... *E21B 34/066* (2013.01); *F16K 1/2007* (2013.01); *F16K 31/0655* (2013.01);
(Continued)

(58) Field of Classification Search
CPC .. F16K 1/2007; F16K 31/0655; E21B 34/066; E21B 2200/06; E21B 2200/05
See application file for complete search history.

(56) References Cited

U.S. PATENT DOCUMENTS 6,253,843 B1    7/2001    Rawson et al.
6,619,388 B2    9/2003    Dietz et al.
(Continued)

OTHER PUBLICATIONS

International Search Report and Written Opinion dated Apr. 22, 2019; International PCT Application No. PCT/US2018/043388.

*Primary Examiner* — Blake E Michener
*Assistant Examiner* — Theodore N Yao
(74) *Attorney, Agent, or Firm* — McGuireWoods LLP

(57) ABSTRACT

Provided are electric safety valves and methods of use. An electric safety valve comprises an electric actuator positioned in an interior chamber of the electric safety valve; the interior chamber comprising a dielectric fluid and being pressure and temperature compensated with a flow passage extending axially through the electric safety valve. The pressure and temperature compensation is performed via a compensating subassembly in pressure communication with the interior chamber thereby providing a section-balanced electric safety valve. The electric safety valve further comprises a protective sleeve separating the interior chamber from the flow passage. The electric safety valve further comprises at least one compression spring rod coupled to a closure member capable of restricting or preventing fluid flow through the flow passage. A method includes actuating the electric actuator; the electric actuator being magnetically coupled to the closure member such that actuation of the electric actuator pivots the closure member.

17 Claims, 6 Drawing Sheets

(52) U.S. Cl.
CPC ....... *E21B 2200/04* (2020.05); *E21B 2200/05* (2020.05); *E21B 2200/06* (2020.05)

(56) References Cited

U.S. PATENT DOCUMENTS

| | | | |
|---|---|---|---|
| 6,988,556 B2 | 1/2006 | Vick, Jr. | |
| 7,213,653 B2 | 5/2007 | Vick, Jr. | |
| 7,434,626 B2 | 10/2008 | Vick, Jr. | |
| 7,597,149 B2 * | 10/2009 | Williamson, Jr. | F16K 15/03 166/332.8 |
| 7,624,807 B2 | 12/2009 | Vick, Jr. | |
| 7,640,989 B2 * | 1/2010 | Williamson, Jr. | E21B 34/066 166/332.8 |
| 8,038,120 B2 * | 10/2011 | Vick, Jr. | F16K 31/086 251/65 |
| 8,573,304 B2 | 11/2013 | Vick, Jr. et al. | |
| 8,869,881 B2 | 10/2014 | Vick, Jr. et al. | |
| 8,919,730 B2 | 12/2014 | Vick, Jr. et al. | |
| 9,010,448 B2 | 4/2015 | Williamson, Jr. et al. | |
| 9,068,425 B2 | 6/2015 | Williamson, Jr. et al. | |
| 9,556,707 B2 | 1/2017 | Vick, Jr. et al. | |
| 9,574,423 B2 | 2/2017 | Williamson, Jr. et al. | |
| 2003/0155131 A1 * | 8/2003 | Vick, Jr. | E21B 34/066 166/375 |
| 2009/0218096 A1 * | 9/2009 | Vick, Jr. | F16K 31/1221 166/250.15 |
| 2010/0051260 A1 * | 3/2010 | Vick, Jr. | E21B 47/017 166/151 |
| 2011/0186303 A1 | 8/2011 | Scott et al. | |
| 2012/0032099 A1 * | 2/2012 | Vick, Jr. | E21B 34/10 251/65 |
| 2012/0261139 A1 * | 10/2012 | Williamson, Jr. | E21B 47/017 166/386 |
| 2013/0043039 A1 | 2/2013 | Sloan et al. | |
| 2013/0126154 A1 * | 5/2013 | Williamson, Jr. | E21B 34/066 166/65.1 |
| 2015/0198011 A1 | 7/2015 | Williamson, Jr. et al. | |

* cited by examiner

SECTION-BALANCED ELECTRIC SAFETY VALVE

TECHNICAL FIELD

The present disclosure relates to safety valves for wellbore operations, and more particularly, to a safety valve that is section-balanced and comprises an electric actuator.

BACKGROUND

After drilling and completion of an oil and gas well, hydrocarbon production may begin. Wellbore fluids, such as hydrocarbons, are produced through production tubing, which may be smaller in diameter than the wellbore, casing, and other conduits disposed in the wellbore. The production tubing runs from a producing zone to a control valve on the wellhead, which in turn connects to outlet piping that will carry the oil or gas to an on-site storage facility to await removal. In the case of an offshore well, the submerged wellhead may be little more than a flange or other device that seals off the casing just above the mudline (top layer of the ocean floor) or in a submerged completion may constitute the entirety of the wellhead.

Damage to the wellhead may result in shutting down the well and stopping production. Moreover, wellhead damage can cause leakage of hydrocarbons and other pollutants. To prevent such damage, producing wells may be fitted with some downhole means of terminating the flow of production fluids in the event of a loss of wellhead integrity. For example, the well may be equipped with a safety valve for slowing down or shutting off the flow of production fluids through the production tubing. If the wellhead control valve is damaged, an abnormally rapid flow rate through the safety valve is detected, which may trigger the safety valve to shut. Safety valves located below the wellhead are called subsurface safety valves. Electric safety valves are actuated by electric actuators.

Subsurface safety valves may be installed in the wellbore along with the production tubing and any other ancillary equipment. There is a limit to the size of the safety valve that can be installed in the wellbore, as the wellbore must accommodate the production tubing and increasing the wellbore diameter may increase drilling and operational expenses. Electric safety valves having electric actuators and electronic components may have larger outer diameters relative to other types of safety valves that do not require such components. Increasing the casing diameter to accommodate a larger safety valve may increase wellbore expenses. Moreover, it is important for a safety valve to maintain a large inner diameter to accommodate a sufficient flow rate of production fluids therethrough.

BRIEF DESCRIPTION OF THE DRAWINGS

Illustrative examples of the present disclosure are described in detail below with reference to the attached drawing figures, which are incorporated by reference herein, and wherein.

Figure 1:
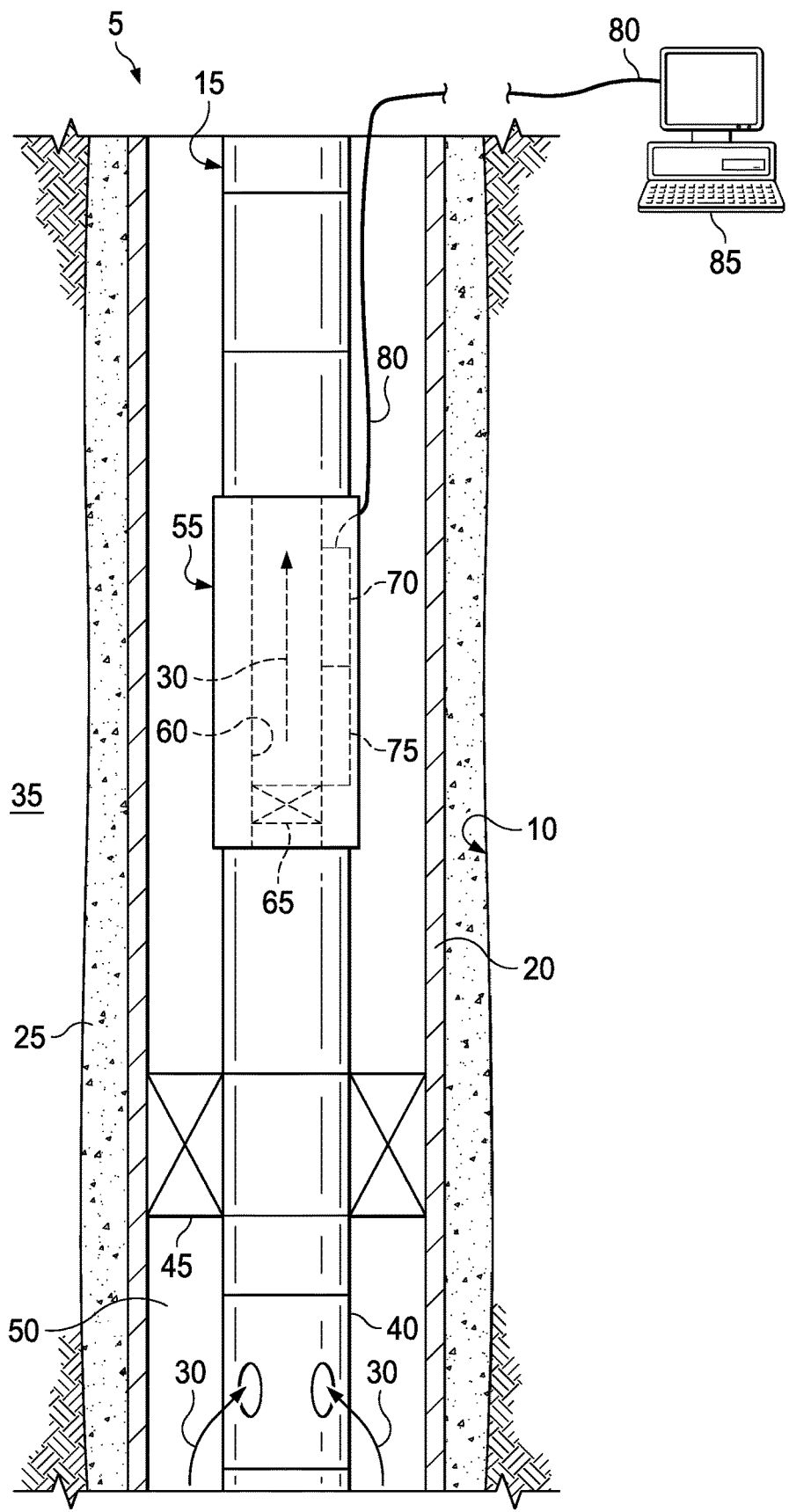
FIG. 1 is a schematic illustrating an example production system comprising an electric safety valve disposed within a wellbore in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates to safety valves for wellbore operations, and more particularly, to a safety valve that is section-balanced and comprises an electric actuator.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Unless otherwise specified, any use of any form of the terms "connect," "engage," "couple," "attach," or any other term describing an interaction between elements is not meant to limit the interaction to direct interaction between the elements and may also include indirect interaction between the elements described. Further, any use of any form of the terms "connect," "engage," "couple," "attach," or any other term describing an interaction between elements includes items integrally formed together without the aid of extraneous fasteners or joining devices. In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

Examples of the methods and systems described herein relate to electric safety valves that are section-balanced instead of annulus-balanced. Advantageously, the electric safety valve is pressure and temperature compensated with the adjacent section of production tubing incorporating the electric safety valve. Further advantageously, this allows the protective sleeve that isolates the dielectric fluid to be disposed on the interior flow passage of the electric safety valve where it may isolate the dielectric fluid from produced fluids flowing therethrough. An additional advantage is that the compression springs that may close off fluid flow through the electric safety valve are disposed parallel with the electric actuator so as to not add length to the electric safety valve. A still further advantage is that the protective sleeve does not need to function as a pressure barrier and thus may be designed to be as thin as possible. This thin protective sleeve allows for increased magnetic coupling, which may ease operation of the opening mechanism of the electric safety valve. Moreover, a thin protective sleeve allows for an increased inner diameter thereby providing a higher rate of flow through the electric safety valve. As such, the combination of features of the disclosed electric safety valve provides for an electric safety valve having a reduced cross-section while maintaining a large inner diameter.

FIG. 1 is a schematic illustrating an example production system 5 disposed within a wellbore 10. A production string 15 is installed in the wellbore 10 lined with casing 20 and cement 25. Produced fluids 30 (in this case, produced hydrocarbons from a subterranean formation 35 penetrated by the wellbore 10) may enter the production string 15 via a flow control device 40 (e.g., inflow control device, sliding sleeve valve, variable choke, etc.). A packer 45 seals off a portion of an annulus 50 formed radially between the production string 15 and the wellbore 10 or casing 20.

An electric safety valve 55 may selectively permit and prevent flow of the produced fluids 30 through a longitudinal flow passage 60 formed through the electric safety valve 55 and the substantial remainder of the production string 15. The electric safety valve 55 comprises a closure member 65, a compensating subassembly 70, and an electric actuator 75. The electric actuator 75 may be used to actuate the closure member 65 between open and closed positions, thereby allowing flow of the produced fluids 30 to be selectively regulated.

The closure member 65 in one example described below comprises a flapper which pivots relative to the flow passage 60 between the open and closed positions. In other examples, the closure member 65 could be a ball, gate, sleeve, or other type of closure member 65. Multiple closure members 65 or multi-piece closure members 65 could be used, if desired.

The electric actuator 75 in the example described below may comprise any type or design of an electric actuator. Specific examples of electric actuators 75 may include, but are not to be limited to, electric linear actuators, ball screw actuators, lead screw actuators, roller screw actuators, linear induction actuators, the like, or any combination thereof. However, it is to be understood that other types of electric actuators 75 may be used in keeping with the scope of this disclosure.

One or more lines 80 may extend from the electric safety valve 55 to a remote location (e.g., the surface, a rig, a subsea location, etc.). The lines 80 can include one or more conductors or conductive means which may be used to convey electrical power, transmit commands, transmit data, receive data, etc.

A control system 85 is located at the remote location and is connected to the lines 80. The control system 85 may include a computing device, a display, memory, software, connectivity means (e.g., to the internet, to a satellite, to a telephone line, etc.), a processor(s), etc., to communicate with and control operation of the electric safety valve 55. Alternatively, the control system 85 could be as simple as a control switch to convey electricity to the electric safety valve 55.

It should be clearly understood that the example production system 5 illustrated by FIG. 1 is merely a general application of the principles of this disclosure in practice, and a wide variety of other examples are possible. Therefore, the scope of this disclosure is not limited in any manner to the details of FIG. 1 as described herein.

Figure 2A:
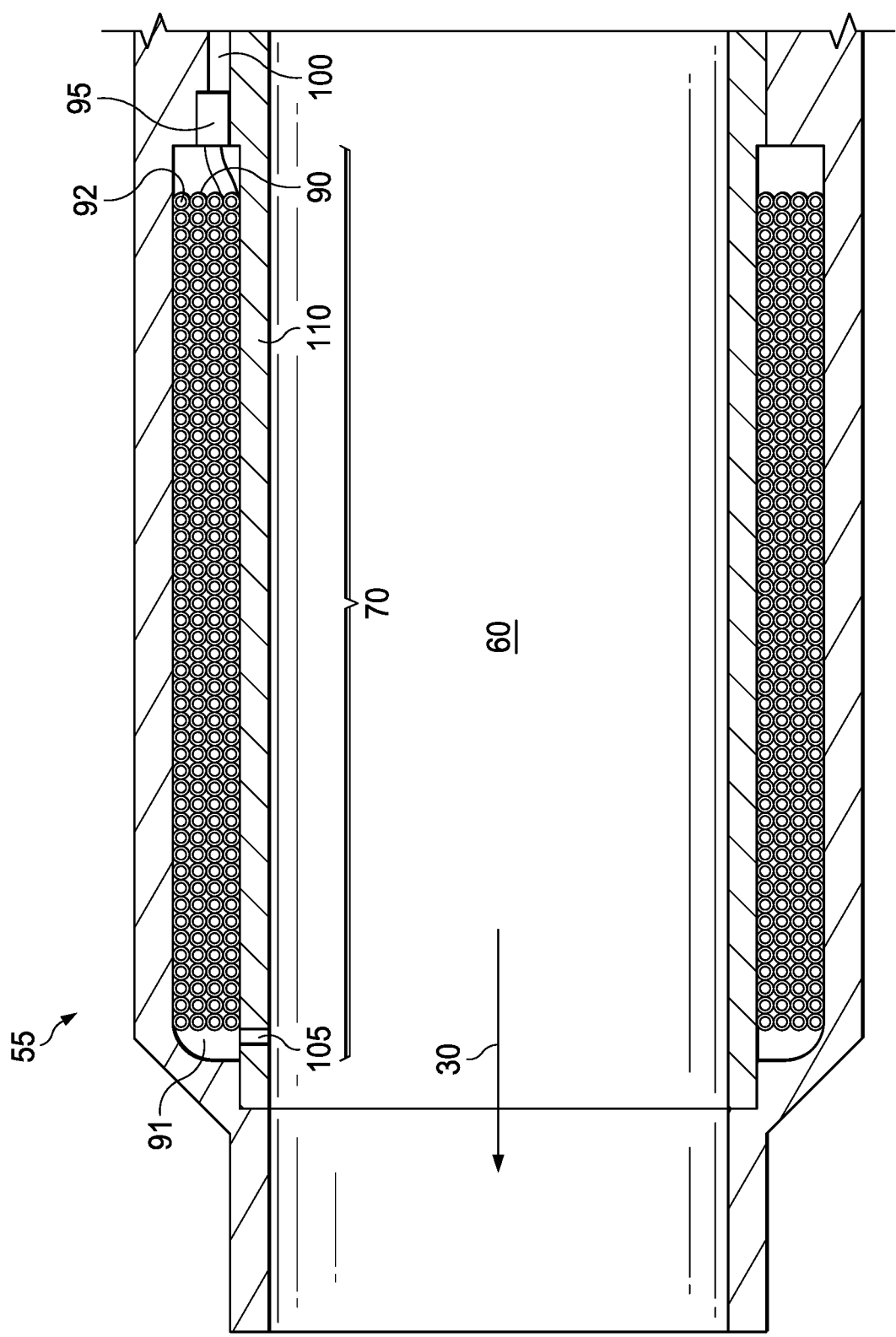
FIG. 2A illustrates a cross-section of a first portion of the electric safety valve of FIG. 1 in accordance with one or more examples described herein.

FIG. 2A illustrates a cross-section of a first portion of the electric safety valve 55. Compensating subassembly 70 comprises coiled tubing 90 arranged in a long and tortuous path such that the flow path through the coiled tubing 90 is of a sufficient length. Coiled tubing 90 is disposed within cavity 91, which is a void disposed within the compensating subassembly 70. The compensating subassembly 70 further comprises a port 95 connecting to an interior flow path 100 comprising the dielectric fluid in an adjacent section of the electric safety valve 55. Produced fluids 30 may enter the compensating subassembly 70 via port 105 in the protective sleeve 110 of the electric safety valve 55. The produced fluids 30 may then fill cavity 91 within the compensating subassembly 70. The produced fluids 30 may enter coiled tubing 90 via end 92 of the coiled tubing 90. End 92 of the coiled tubing 90 is illustrated as downhole of port 105 and proximate to port 95, port 95 being coupled to the other end of the coiled tubing 90. In an alternative embodiment, the end 92 may be disposed in a more uphole region of cavity 91. Port 95 provides pressure communication between the coiled tubing 90 and the interior flow path 100. As the coiled tubing 90 of the compensating subassembly 70 is in pressure communication via port 105 with the flow passage 60 that extends through the electric safety valve 55 and the production string 15, the interior flow path 100 which comprises the dielectric fluid is pressure and temperature balanced with this adjacent section of the flow passage 60. This arrangement provides a section-balanced electric safety valve 55.

Coiled tubing 90 is coiled such that the produced fluids 30 may not reach the interior flow path 100 should the interior flow path 100 be opened to the coiled tubing 90 of the compensating subassembly 70. In all examples the produced fluids 30 and the dielectric fluid remain in pressure communication with one another providing a section-balanced electric safety valve. The long tortuous path of the coiled tubing 90 in the compensating subassembly 70 is of sufficient length to allow for sufficient expansion and contraction of the produced fluids 30 and dielectric fluid with increased and decreased temperatures, which may result in a greater range of pressure transmission.

In an alternative example, the coiled tubing 90 may be substituted for another assembly sufficient for restricting fluid communication between the produced fluids 30 and the dielectric fluid in the interior flow path 100, while allowing pressure communication between the flow passage 60 and the interior flow path 100 to allow for the interior flow path 100 and the internal components to be pressure and temperature compensated with the flow passage 60. One such alternative assembly may be a floating piston. A floating piston could be placed in the compensating subassembly 70 to isolate the dielectric fluid from the produced fluids 30 which would enter the interior flow path 100 via port 95. The floating piston would permit the interior flow path 100 (and the downstream interior chamber 115 as discussed below) to be section-balanced without any mixing of the produced fluids 30 and the dielectric fluid. The floating piston assembly would be reciprocally and sealingly received in the cavity 91 in place of or in addition to the coiled tubing 90. A pressure relief valve or other pressure relief device may be provided in the compensating subassembly 70 or in the floating piston itself to relieve excess pressure in the interior flow path 100 due, for example, to increased temperature. The floating piston could move inward and outward with changes in pressure, but its inward movement could be limited by the compressibility of the dielectric fluid, and its outward movement could be limited by the expansiveness of the dielectric fluid.

Figure 2B:
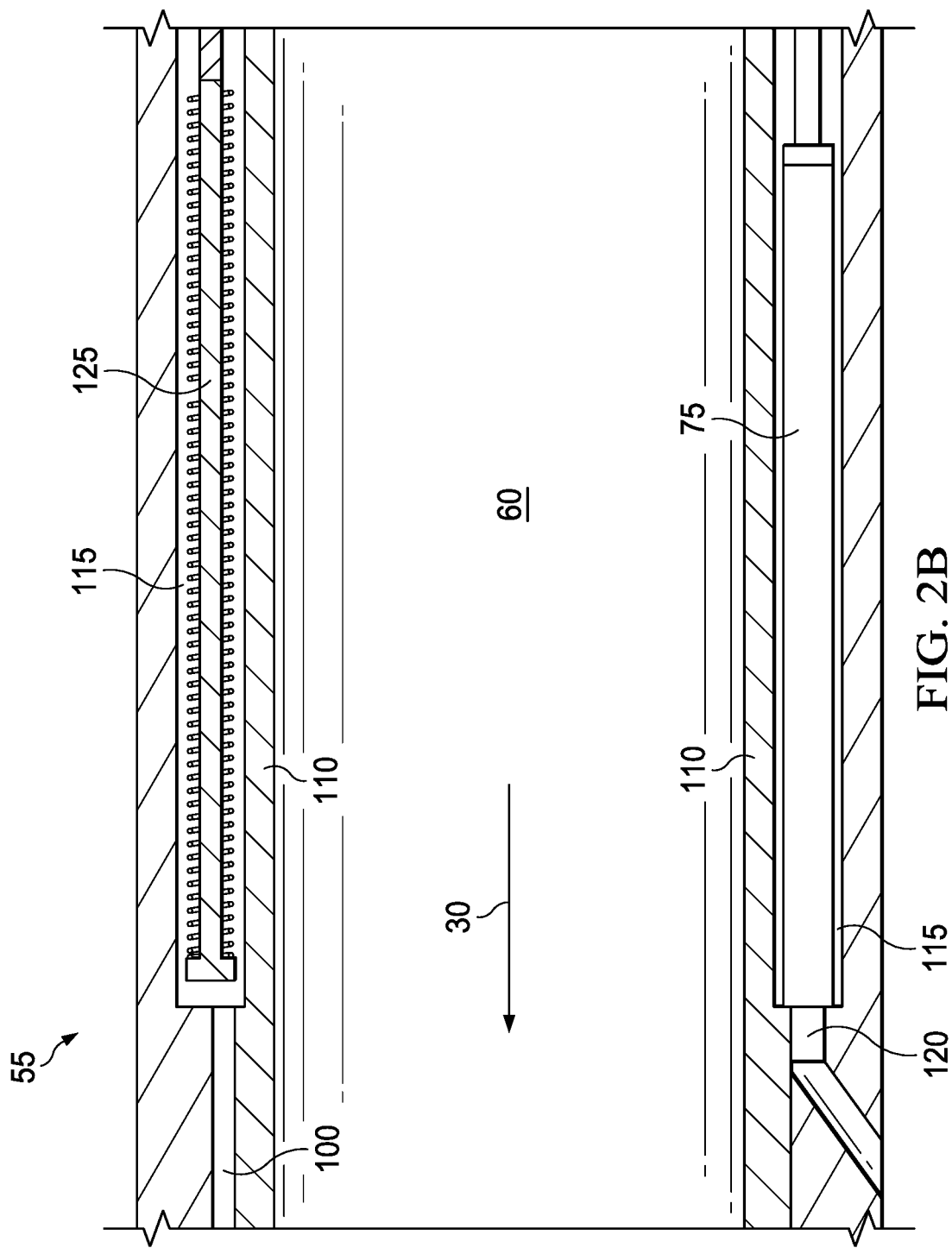
FIG. 2B illustrates a cross-section of the closed configuration of a second portion of electric safety valve that is adjacent to the portion illustrated in FIG. 2A in accordance with one or more examples described herein.

FIG. 2B illustrates a cross-section of a second portion of the electric safety valve 55 that is adjacent to the first portion illustrated in FIG. 2A. The electric actuator 75 is positioned in an interior chamber 115 that is in fluid and pressure communication with interior flow path 100. A dielectric fluid is present in the interior chamber 115 and the interior flow path 100. The dielectric fluid may be any sufficient dielectric fluid (e.g., a silicone fluid, etc.) for a desired wellbore operation. The dielectric fluid surrounds the electric actuator 75 in the interior chamber 115. The dielectric fluid may also fill a substantial portion of the interior flow path 100. Optional port 120 may be used to connect to the above-mentioned lines 80 to provide a means of conveying electricity to the electric actuator 75. Port 120 is only illustrated in its present position as an example and may be positioned elsewhere on the electric safety valve 55 as desired. Moreover, in some examples, the lines 80 may be coupled to the electric safety valve and/or the electric actuator via other mechanisms that may not require a port 120.

Interior chamber 115 is isolated from the produced fluids 30 via a protective sleeve 110. The protective sleeve 110 does not need to withstand a pressure differential between the interior chamber 115 and the flow passage 60, and thus does not require a thick protective sleeve to withstand a pressure differential. The protective sleeve 110 need only be of sufficient thickness to physically isolate the interior chamber 115 and the interior flow path 100 from the produced fluids 30 in the flow passage 60. Providing a thin protective sleeve 110 allows for the interior diameter of the electric safety valve 55 to be larger than it would be if the protective sleeve 110 also functioned to withstand a large pressure differential.

Although not illustrated, electronic components sufficient to operate the electric actuator 75 may also be present in the interior chamber 115. These electronic components may also be surrounded by the dielectric fluid. Examples of such electronic components may include various sensors to determine the pressure and temperature in the interior chamber 115, and therefore the pressure and temperature in the flow passage 60 as the interior chamber 115 is pressure and temperature balanced with the flow passage 60. Additional electronic components may relay the position and/or force of the electric actuator 75 as well as any other electric safety valve 55 parameters. Other additional electronic components may include the logic for controlling the electric actuator 75. The logic may induce the starting, stopping, powering, depowering, etc. of the electric actuator 75. In some optional examples, the data received by and/or transmitted to the electronic components may be received by and/or transmitted to the control system 85 discussed above in FIG. 1.

With continued reference to FIG. 2B, the interior chamber 115 further comprises at least one compression spring rod 125. The compression spring rod 125 comprises a rod and at least one spring. In the illustrated example, the compression spring rod 125 comprises two springs wound in opposing directions (i.e., one is left-hand wound and the other is right-hand wound). The compression spring rod 125 is illustrated as expanded in this closed configuration of the electric safety valve 55. The compression spring rod 125 is connected to the same guide plate or other such cross-sectional coupling piece as the electric actuator 75 as is discussed and illustrated below. Actuation of the electric actuator 75 induces the opening of the flow passage 60 by moving the closure member 65 into its open position. This mechanism also results in the compression of the springs of the compression spring rod 125. If the electric actuator 75 loses power such that the electric actuator 75 cannot actuate the opening of the closure member 65, the compressed springs of the compression spring rod 125 expand to the presently illustrated configuration, which closes the closure member 65 resulting in a block of flow through flow passage 60. Although only one compression spring rod 125 is illustrated, it is to be understood that as many compression spring rods 125 may be used as is necessary to generate sufficient force to close the closure member 65. Moreover, it is to be understood that the electric actuator 75 should be sufficient to provide enough force necessary to overcome the biasing force of the compression springs of the compression spring rod 125 in order to actuate the opening of the electric safety valve 55. The compression spring rod 125 may be positioned radially around the axis of the electric safety valve 55. Of particular importance is that the compression spring rod 125 is located parallel to the electric actuator 75. As such, the electric safety valve 55 does not need to be any longer in order to accommodate the compression spring rod 125. In an optional embodiment, the compression spring rod 125 may be in series with the electric actuator 75. The compression spring rod 125 may be located in series with the electric actuator 75 in conjunction with compression spring rods 125 located in parallel to the electric actuator or the compression spring rod 125 may be located in series with the electric actuator without the use of any parallel compression spring rods 125. It is to be understood, however, that the use of compression spring rods 125 in series with the electric actuator may result in the need to lengthen the electric safety valve 55.

In an alternative example, the compensating subassembly 70 is positioned downhole of the second portion of the electric safety valve 55 illustrated by FIG. 2B. As such, the positions of the first portion of the electric safety valve 55 illustrated in FIG. 2A and the second portion of the electric safety valve 55 illustrated in FIG. 2B are reversed.

Figure 2C:
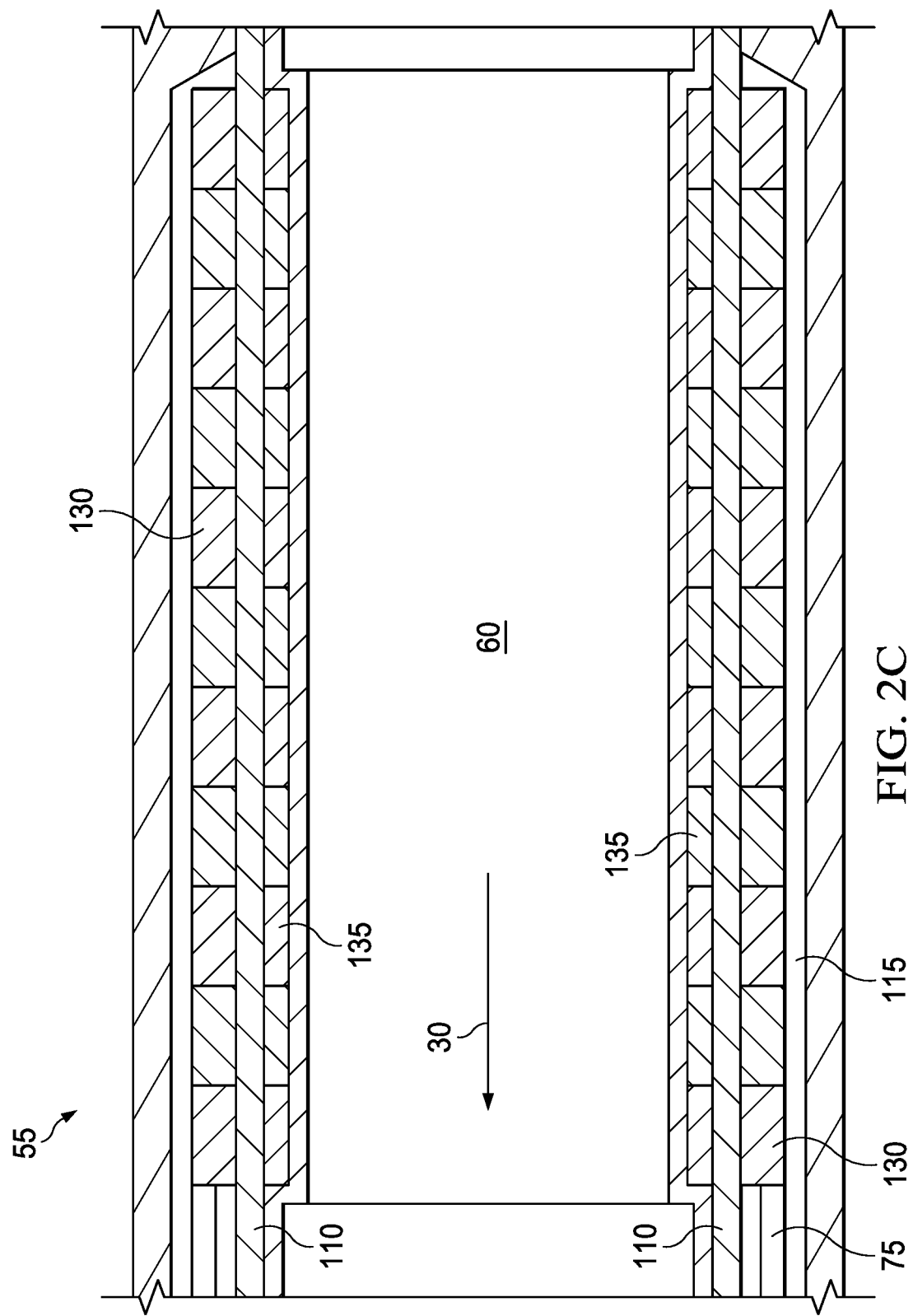
FIG. 2C illustrates a cross-section of the open configuration of a third portion of the electric safety valve that is adjacent to the portion illustrated in FIG. 2B in accordance with one or more examples described herein.

FIG. 2C illustrates a cross-section of a third portion of the electric safety valve 55 that is adjacent to the second portion illustrated in FIG. 2B. As is discussed is greater detail below, the closure member 65 is opened via contact with a tubular sleeve. The tubular sleeve is displaced to open the closure member 65 through the movement of a series of magnets connected thereto, said magnets being magnetically coupled to another series of magnets connected to the actuating mechanism of the electric actuator 75. As such, the electric actuator 75 is able to actuate the opening or closing of the closure member 65 via this magnetic coupling, and said actuating mechanism does not require physical contact of the closure member 65 to any component of the electric actuator 75.

As just discussed, the electric actuator 75 is coupled to an outer series of magnets 130, which may be arranged in rows radially around the axis of the electric safety valve 55. The outer series of magnets 130 are coupled to the drive mechanism of the electric actuator 75 via any sufficient means such that actuation of the electric actuator 75 induces movement of the outer series of magnets 130 in the desired direction. The outer series of magnets 130 are magnetically coupled to an inner series of magnets 135. The inner series of magnets 135 may be arranged in rows radially around the axis of the electric safety valve 55. The inner series of magnets 135 are coupled to a tubular sleeve via any sufficient means such that movement of the inner series of magnets 135 induces movement of the tubular sleeve in the desired direction. As such, actuation of the electric actuator 75 induces movement of the tubular sleeve, which as is discussed below contacts the closure member 65 to move the closure member 65 to an open or closed position.

Any number of magnets for the outer series of magnets 130 and the inner series of magnets 135 may be used as will be readily apparent to one of ordinary skill in the art. Any number of magnet rows for the outer series of magnets 130 and the inner series of magnets 135 may be used as will be readily apparent to one of ordinary skill in the art. The number of magnet rows for the outer series of magnets 130 and the inner series of magnets 135 may be the same or different. For example, in the illustration of FIG. 2C, the outer series of magnets 130 comprises eight rows of magnets, and the inner series of magnets 135 comprises seven rows of magnets.

The magnets of the outer series of magnets 130 and the inner series of magnets 135 are preferably constructed and arranged so that their poles are appropriately aligned to maximize the magnetic attraction therebetween. As used herein, the term "magnet" indicates those materials and devices that may be used to generate a magnetic field. Magnets include materials such as permanent and temporary magnetic materials. Magnets also include devices, such as electromagnets, that may be used to generate magnetic fields. Instead of using the outer series of magnets 130 and the inner series of magnets 135, a suitable magnetic coupling may comprise other types of magnetic devices. For example, the magnets could comprise an electromagnet and a ferrous material, the ferrous material arranged to be displaced in response to the magnetic field generated by the electromagnet. Any combination of magnets and/or magnetically reactive materials or devices may be used for each of the outer series of magnets 130 and the inner series of magnets 135. Thus, any types of magnets may be used to produce a magnetic coupling sufficient for the operation of the closure member 65 as described herein.

The protective sleeve 110 functions as a fluid isolation barrier between the outer series of magnets 130 and the inner series of magnets 135. As discussed above, the protective sleeve 110 does not function to withstand a pressure differential. Thus, the outer series of magnets 130 and the inner series of magnets 135 are exposed to the same pressure. As the protective sleeve 110 does not need to function to withstand a pressure differential, it may be made as thin as is possible to allow for a greater magnetic coupling between the outer series of magnets 130 and the inner series of magnets 135. Moreover, the reduced thickness of the protective sleeve 110 also allows for the inner diameter of the electric safety valve 55 to be increased.

In some examples, the inner series of magnets 135 may be exposed to the flow passage 60 if desired. In alternative examples, the inner series of magnets 135 may be covered with any sufficient housing.

Figure 2D:
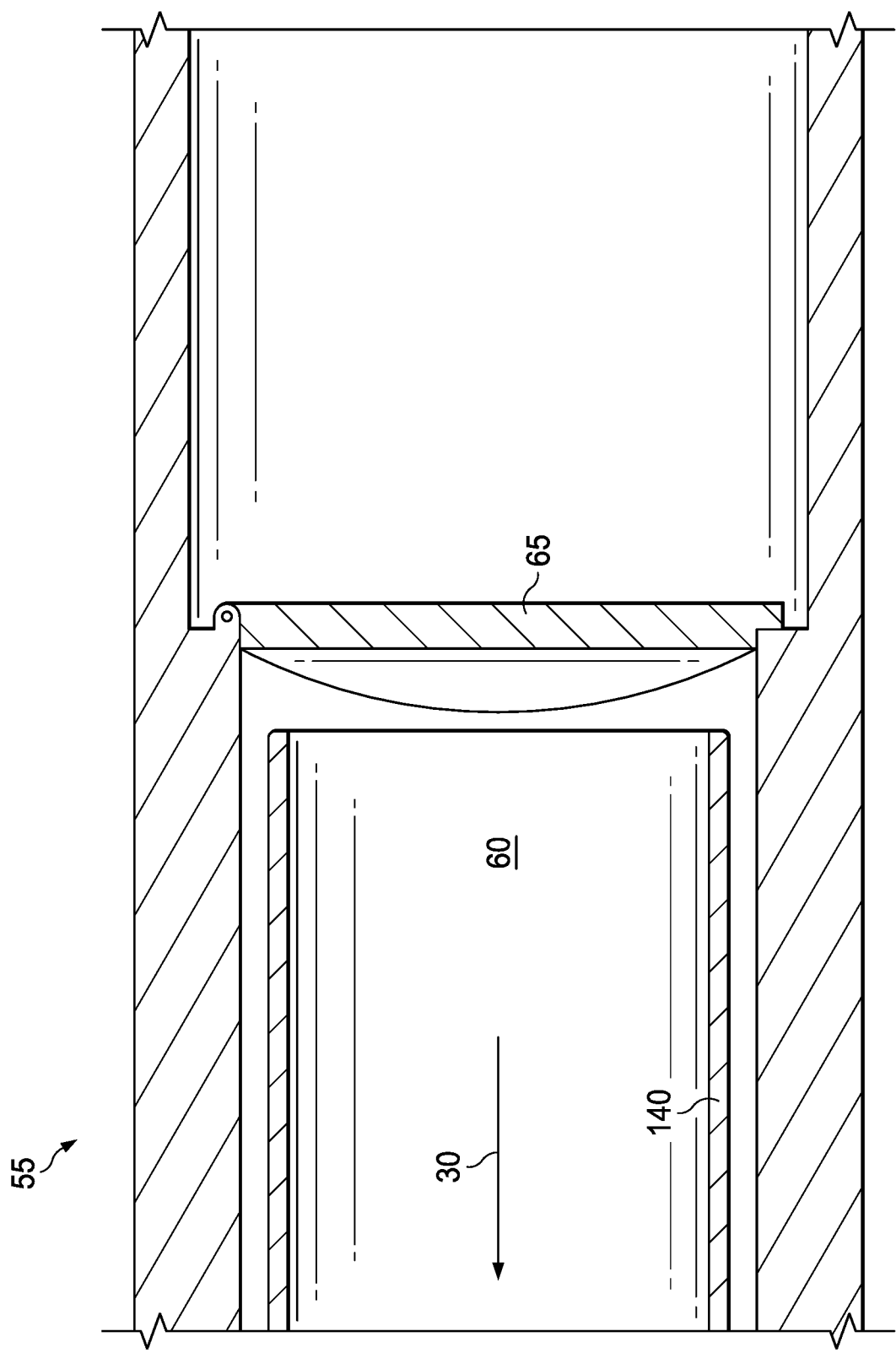
FIG. 2D illustrates a cross-section of the closed configuration of a fourth portion of the electric safety valve that is adjacent to the portion illustrated in FIG. 2C in accordance with one or more examples described herein.

FIG. 2D illustrates a cross-section of a fourth portion of the electric safety valve 55 that is adjacent to the third portion illustrated in FIG. 2C. As discussed above, tubular sleeve 140 is coupled to the inner series of magnets 135 illustrated in FIG. 2C. Translation of the outer series of magnets 130 induces a corresponding translation of the inner series of magnets 135 due to the magnetic coupling of the outer series of magnets 130 to the inner series of magnets 135. Translation of the inner series of magnets 135 moves the tubular sleeve 140 connected thereto. The tubular sleeve 140 contacts the closure member 65 and displaces the closure member 65 resulting in the opening of the electric safety valve 55.

The closure member 65 is illustrated as a flapper-type closure member and may be used to selectively open and close the flow passage 60 extending axially through the electric safety valve 55. The closure member 65 is shown in its closed position in the illustration of FIG. 2D. In some optional examples, a spring may be used to bias the closure member 65 to pivot to its closed position. The tubular sleeve 140 may be used to displace the closure member 65 between its open and closed positions, as discussed above. As depicted in the drawings, the tubular sleeve 140 is in its upward position in which it has not displaced the closure member 65. Downward displacement of the tubular sleeve 140 via the above-described magnetic coupling will permit the closure member 65 to transition to its open position. Although the closure member 65 is depicted as being a flapper-type closure member, any type of closure member may be used to selectively open and close the electric safety valve 55. For example, the closure member 65 could instead comprise a ball valve or any other sufficient valve mechanism.

Figure 3:
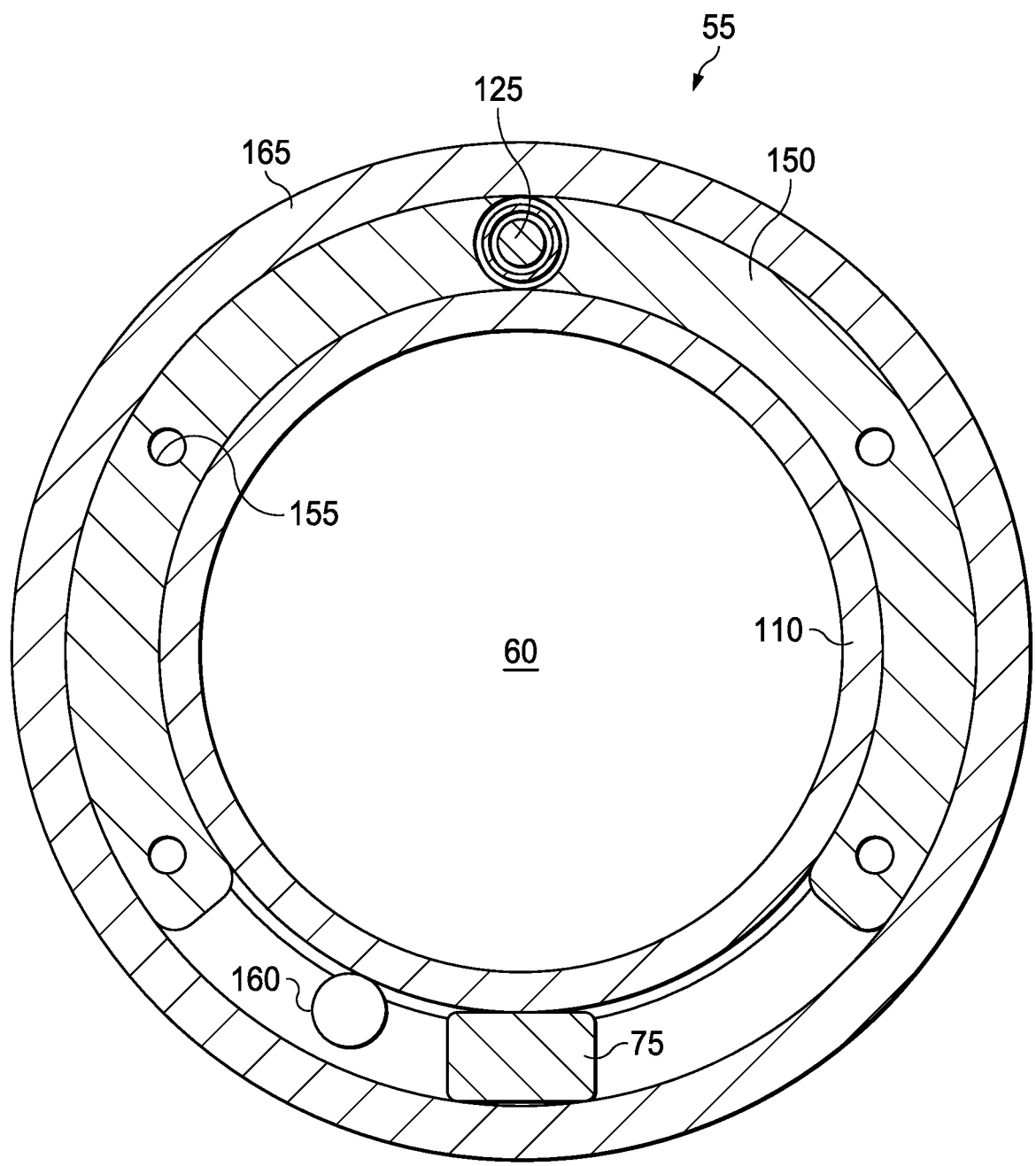
FIG. 3 illustrates another cross-section of the second portion of the electric safety valve in accordance with one or more examples described herein.

FIG. 3 illustrates a cross-section through the section of the electric safety valve 55 illustrated in FIG. 2B. From this perspective, the compression spring rod 125 and the electric actuator 75 are shown disposed parallel to each other relative to the axis of the electric safety valve 55. The compression spring rod 125 and the electric actuator 75 are disposed in a guide plate 150, which may couple the two components such that translation of one results in translation of the other. Additional guideplates 150 and/or other such coupling means may be present if desired. Only one compression spring rod 125 is illustrated, but it is to be understood that many compression spring rods may be used and slotted into voids 155 if desired. As discussed, as many compression spring rods 125 may be used as is necessary to generate sufficient force to close the closure member 65 should the electric actuator 75 be unused, lose power, etc. Likewise, only one electric actuator 75 is illustrated; however, it is to be understood that any number of electric actuators 75 may be used. It is to be understood that the electric actuator 75, or number of electric actuators 75, should be sufficient to provide enough force necessary to overcome the biasing force of the compression springs of the compression spring rod 125 in order to actuate the opening of the electric safety valve 55.

Electronic components 160, as discussed above, are also illustrated and may be disposed proximate to the electric actuator 75. As many electronic components 160 may be used as is necessary to provide the desired functionality to the electric actuator 75. Protective sleeve 110 prevents contact fluid communication between any produced fluids 30 flowing in flow passage 60 and the internal components such as the electric actuator 75. The protective sleeve 110 is made as thin as possible and does not function as a pressure barrier. The dielectric fluid and internal components within the interior flow path 100 and the interior chamber 115 discussed above in FIGS. 2A-2D are pressure and temperature compensated with the produced fluids 30 flowing through flow passage 60. Electric safety valve housing 165 is the outermost covering of the electric safety valve 55 and prevents fluid communication from the wellbore annulus 50 into the electric safety valve 55 as well as serves as a pressure barrier preventing pressure communication of the annular pressure with the interior of the electric safety valve 55, as the electric safety valve 55 is section-balanced and not annulus-balanced.

It should be clearly understood that the example electric safety valve 55 illustrated by FIGS. 2A-3 is but one general application of the principles of this disclosure in practice, and a wide variety of other examples are possible. Therefore, the scope of this disclosure is not limited in any manner to the details of FIG. 1 as described herein.

It is also to be recognized that the disclosed electric safety valves may also directly or indirectly affect the various downhole equipment and tools that may contact the electric safety valves disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the methods and systems generally described above and depicted in FIGS. 1-3.

Provided are methods of operating an electric safety valve in accordance with the disclosure and the illustrated FIGs. An example method comprises positioning the electric safety valve in a wellbore; wherein the electric safety valve comprises an electric actuator positioned in an interior chamber of the electric safety valve; wherein the interior chamber further comprises a dielectric fluid and the interior chamber is pressure and temperature compensated with a flow passage extending axially through the electric safety valve; wherein the pressure and temperature compensation is performed via a compensating subassembly in pressure communication with the interior chamber thereby providing a section-balanced electric safety valve; wherein the electric safety valve further comprises a protective sleeve separating the interior chamber from the flow passage; and wherein the electric safety valve further comprises at least one compression spring rod coupled to a closure member capable of restricting or preventing fluid flow through the flow passage. The method further comprises actuating the electric actuator; wherein the electric actuator is magnetically coupled to the closure member such that actuation of the electric actuator pivots the closure member to an open or closed position.

Additionally or alternatively, the method may include one or more of the following features individually or in combination. The electric actuator may be an electric actuator selected from the group consisting of electric linear actuators, ball screw actuators, lead screw actuators, roller screw actuators, linear induction actuators, and any combination thereof. The method may further comprise allowing or causing to allow the compression spring rods to expand in response to a loss of power to the electric actuator. The expansion of the compression spring rods may induce the closure member to pivot to its closed position. The closure member may be a flapper, ball, gate, or sleeve. The magnetic coupling may comprise an inner series of magnets and an outer series of magnets separated by the protective sleeve; wherein the inner series of magnets comprises at least one row of magnets distributed radially in the electric safety valve; and wherein the outer series of magnets comprises at least one row of magnets distributed radially in the electric safety valve. The compression spring rod may be parallel to the electric actuator. The compensating subassembly may further comprise coiled tubing that is coiled in a tortuous path. The compensating subassembly may further comprise a floating piston.

Provided are electric safety valves in accordance with the disclosure and the illustrated FIGs. An example electric safety valve comprises an electric actuator positioned in an interior chamber of the electric safety valve; and wherein the interior chamber further comprises a dielectric fluid and the interior chamber is pressure and temperature compensated with a flow passage extending axially through the electric safety valve. The electric safety valve further comprises a compensating subassembly configured to perform the pressure and temperature compensating. The electric safety valve further comprises a protective sleeve separating the interior chamber from the flow passage. The electric safety valve further comprises at least one compression spring rod coupled to a closure member capable of restricting or preventing fluid flow through the flow passage and a magnetic coupling of the closure member to the electric actuator.

Additionally or alternatively, the electric safety valve may include one or more of the following features individually or in combination. The electric actuator may be an electric actuator selected from the group consisting of electric linear actuators, ball screw actuators, lead screw actuators, roller screw actuators, linear induction actuators, and any combination thereof. The closure member may be a flapper, ball, gate, or sleeve. The magnetic coupling may comprise an inner series of magnets and an outer series of magnets separated by the protective sleeve; wherein the inner series of magnets comprises at least one row of magnets distributed radially in the electric safety valve; and wherein the outer series of magnets comprises at least one row of magnets distributed radially in the electric safety valve. The compression spring rod may be parallel to the electric actuator. The compensating subassembly may further comprise coiled tubing that is coiled in a tortuous path. The compensating subassembly may further comprise a floating piston.

Provided are systems for operating an electric safety valve in accordance with the disclosure and the illustrated FIGs. An example system comprises an electric safety valve comprising an electric actuator positioned in an interior chamber of the electric safety valve; and wherein the interior chamber further comprises a dielectric fluid and the interior chamber is pressure and temperature compensated with a flow passage extending axially through the electric safety valve. The electric safety valve further comprises a compensating subassembly configured to perform the pressure and temperature compensating. The electric safety valve further comprises a protective sleeve separating the interior chamber from the flow passage. The electric safety valve further comprises at least one compression spring rod coupled to a closure member capable of restricting or preventing fluid flow through the flow passage and a magnetic coupling of the closure member to the electric actuator. The system further comprises production tubing; wherein the electric safety valve is coupled to the production tubing. The system further comprises a control system coupled to the electric safety valve.

Additionally or alternatively, the system may include one or more of the following features individually or in combination. The electric actuator may be an electric actuator selected from the group consisting of electric linear actuators, ball screw actuators, lead screw actuators, roller screw actuators, linear induction actuators, and any combination thereof. The system may be configured to allow or cause to allow the compression spring rods to expand in response to a loss of power to the electric actuator. The expansion of the compression spring rods may induce the closure member to pivot to its closed position. The closure member may be a flapper, ball, gate, or sleeve. The magnetic coupling may comprise an inner series of magnets and an outer series of magnets separated by the protective sleeve; wherein the inner series of magnets comprises at least one row of magnets distributed radially in the electric safety valve; and wherein the outer series of magnets comprises at least one row of magnets distributed radially in the electric safety valve. The compression spring rod may be parallel to the electric actuator. The compensating subassembly may further comprise coiled tubing that is coiled in a tortuous path. The compensating subassembly may further comprise a floating piston.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method of operating an electric safety valve, the method comprising:
   positioning the electric safety valve in a wellbore; wherein the electric safety valve comprises an electric actuator positioned in an interior chamber of the electric safety valve; wherein the interior chamber further comprises a dielectric fluid and the interior chamber is pressure and temperature compensated with a flow passage extending axially through the electric safety valve; wherein the pressure and temperature compensation is performed via a compensating subassembly in pressure communication with the interior chamber thereby resulting in the electric safety valve being section-balanced; wherein the electric safety valve further comprises a protective sleeve separating the interior chamber from the flow passage; wherein the electric safety valve further comprises at least one compression spring rod coupled to a closure member capable of restricting or preventing fluid flow through the flow passage; and
   actuating the electric actuator; wherein the electric actuator is magnetically coupled to the closure member such that actuation of the electric actuator pivots the closure member to an open or closed position; wherein the magnetic coupling comprises an inner series of magnets and an outer series of magnets separated by the protective sleeve; wherein the inner series of magnets comprises at least one row of magnets distributed radially in the electric safety valve; and wherein the outer series of magnets comprises at least one row of magnets distributed radially in the electric safety valve; wherein the protective sleeve functions as a fluid barrier between the interior chamber and the flow passage and whereby the compensating subassembly pressure balances the interior chamber with the flow passage such that the protective sleeve does not function as a pressure barrier between the flow passage and the interior chamber; and wherein the at least one compression spring rod is parallel to the electric actuator and is disposed at the same longitudinal position as the electric actuator; wherein the at least one compression spring rod is a spring coiled around a rod;

further comprising allowing or causing to allow the at least one compression spring rod to expand in response to a loss of power to the electric actuator.

2. The method of claim 1, wherein the electric actuator is an electric actuator selected from the group consisting of electric linear actuators, ball screw actuators, lead screw actuators, roller screw actuators, linear induction actuators, and any combination thereof.

3. The method of claim 1, wherein the expansion of the at least one compression spring rod induces the closure member to pivot to its closed position.

4. The method of claim 1, wherein the closure member is a flapper, ball, gate, or sleeve.

5. The method of claim 1, wherein the compensating subassembly further comprises coiled tubing that is coiled in a tortuous path.

6. The method of claim 1, wherein the compensating subassembly further comprises a floating piston.

7. An electric safety valve comprising:
    an electric actuator positioned in an interior chamber of the electric safety valve;
wherein the interior chamber further comprises a dielectric fluid and the interior chamber is pressure and temperature compensated with a flow passage extending axially through the electric safety valve;
    a compensating subassembly configured to perform the pressure and temperature compensating;
    a protective sleeve separating the interior chamber from the flow passage;
    at least one compression spring rod coupled to a closure member capable of restricting or preventing fluid flow through the flow passage; and
    a magnetic coupling of the closure member to the electric actuator, wherein the magnetic coupling comprises an inner series of magnets and an outer series of magnets separated by the protective sleeve; wherein the inner series of magnets comprises at least one row of magnets distributed radially in the electric safety valve;
and wherein the outer series of magnets comprises at least one row of magnets distributed radially in the electric safety valve; wherein the protective sleeve functions as a fluid barrier between the interior chamber and the flow passage and whereby the compensating subassembly pressure balances the interior chamber with the flow passage such that the protective sleeve does not function as a pressure barrier between the flow passage and the interior chamber; and wherein the at least one compression spring rod is parallel to the electric actuator and is disposed at the same longitudinal position as the electric actuator; wherein the at least one compression spring rod is a spring coiled around a rod;

wherein the at least one compression spring rod is configured to expand in response to a loss of power to the electric actuator.

8. The electric safety valve of claim 7, wherein the electric actuator is an electric actuator selected from the group consisting of electric linear actuators, ball screw actuators, lead screw actuators, roller screw actuators, linear induction actuators, and any combination thereof.

9. The electric safety valve of claim 7, wherein the closure member is a flapper, ball, gate, or sleeve.

10. The electric safety valve of claim 7, wherein the compensating subassembly further comprises coiled tubing that is coiled in a tortuous path.

11. The electric safety valve of claim 7, wherein the compensating subassembly further comprises a floating piston.

12. The electric safety valve of claim 7, wherein the at least one compression spring rod is expandable and the expansion of the at least one compression spring rod induces the closure member to pivot to its closed position.

13. A production system for a wellbore, the system comprising:
    an electric safety valve comprising: an electric actuator positioned in an interior chamber of the electric safety valve; wherein the interior chamber further comprises a dielectric fluid and the interior chamber is pressure and temperature compensated with a flow passage extending axially through the electric safety valve;
    a compensating subassembly configured to perform the pressure and temperature compensating;
    a protective sleeve separating the interior chamber from the flow passage;
    at least one compression spring rod coupled to a closure member capable of restricting or preventing fluid flow through the flow passage; and
    a magnetic coupling of the closure member to the electric actuator, wherein the magnetic coupling comprises an inner series of magnets and an outer series of magnets separated by the protective sleeve; wherein the inner series of magnets comprises at least one row of magnets distributed radially in the electric safety valve;
    and wherein the outer series of magnets comprises at least one row of magnets distributed radially in the electric safety valve; wherein the protective sleeve functions as a fluid barrier between the interior chamber and the flow passage and whereby the compensating subassembly pressure balances the interior chamber with the flow passage such that the protective sleeve does not function as a pressure barrier between the flow passage and the interior chamber; and
    wherein the at least one compression spring rod is parallel to the electric actuator and is disposed at the same longitudinal position as the electric actuator; wherein the at least one compression spring rod is a spring coiled around a rod;
    wherein the at least one compression spring rod is configured to expand in response to a loss of power to the electric actuator;
    production tubing; wherein the electric safety valve is coupled to the production tubing; and
    a control system coupled to the electric safety valve.

14. The production system of claim 13, wherein the electric actuator is a an electric actuator selected from the group consisting of electric linear actuators, ball screw actuators, lead screw actuators, roller screw actuators, linear induction actuators, and any combination thereof.

15. The production system of claim 13, wherein the compensating subassembly further comprises coiled tubing that is coiled in a tortuous path.

16. The production system of claim 13, wherein the at least one compression spring rod is expandable and the expansion of the at least one compression spring rod induces the closure member to pivot to its closed position.

17. The production system of claim 13, wherein the closure member is a flapper, ball, gate, or sleeve.

* * * * *

UNITED STATES PATENT AND TRADEMARK OFFICE
CERTIFICATE OF CORRECTION

PATENT NO. : 11,035,199 B2
APPLICATION NO. : 16/462150
DATED : June 15, 2021
INVENTOR(S) : James D. Vick, Jr. and Bruce E. Scott Page 1 of 1

It is certified that error appears in the above-identified patent and that said Letters Patent is hereby corrected as shown below:

In the Claims

Column 13, Claim 7, Line 1, replace the word "safely" with "safety"

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*